United States Patent
Franz et al.

(10) Patent No.: US 12,343,800 B2
(45) Date of Patent: Jul. 1, 2025

(54) DEVICE AND METHOD FOR PRODUCING METAL POWDER USING AN INDUCTION COIL AND AN INTERMEDIATE COIL

(71) Applicant: ALD VACUUM TECHNOLOGIES GMBH, Hanau (DE)

(72) Inventors: Henrik Franz, Freigericht Horbach (DE); Christian Lehnert, Hanau (DE); Markus Winton, Karben (DE); Sergejs Spitans, Frankfurt am Main (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 0 days.

(21) Appl. No.: 18/559,358

(22) PCT Filed: May 9, 2022

(86) PCT No.: PCT/EP2022/062464
§ 371 (c)(1),
(2) Date: Nov. 7, 2023

(87) PCT Pub. No.: WO2022/238317
PCT Pub. Date: Nov. 17, 2022

(65) Prior Publication Data
US 2024/0261857 A1 Aug. 8, 2024

(30) Foreign Application Priority Data

May 10, 2021 (DE) .......................... 102021112151.5

(51) Int. Cl.
B22F 9/08 (2006.01)
C22B 9/00 (2006.01)

(52) U.S. Cl.
CPC .............. *B22F 9/082* (2013.01); *C22B 9/003* (2013.01); *B22F 2009/0824* (2013.01);
(Continued)

(58) Field of Classification Search
None
See application file for complete search history.

(56) References Cited

U.S. PATENT DOCUMENTS

| 4,639,567 A | * | 1/1987 | Stenzel | .................. F27D 11/06 |
| | | | | 219/652 |
| 4,762,553 A | | 8/1988 | Savage et al. | |

(Continued)

FOREIGN PATENT DOCUMENTS

| CN | 106334799 A | | 1/2017 |
| CN | 108672709 A | * | 10/2018 |

(Continued)

OTHER PUBLICATIONS

English translation of CN 108672709 (originally published Oct. 19, 2018), obtained from PE2E search.*

*Primary Examiner* — George Wyszomierski
(74) *Attorney, Agent, or Firm* — Hudak, Shunk & Farine Co. LPA

(57) ABSTRACT

A device for producing metal powder. This includes a melting chamber, a downstream atomization tower, and a nozzle assembly for atomizing a melt jet. The device further includes an induction coil disposed within the melting chamber and operated at a melting frequency $f_{melt}$, the induction coil is adapted to locally melt a material rod at least section-wise received therein, to produce the melt jet to be atomized, and a separate intermediate coil disposed within the melting chamber and operated at a base frequency $f_{base}$, wherein said intermediate coil is disposed downstream of the induction coil and aligned coaxially with the induction coil. The intermediate coil is configured to superheat the melt jet in a region between the induction coil and the nozzle assembly. The following applies to a frequency ratio $F_{BS}$ of the base frequency $f_{base}$ to the melting frequency $f_{melt}$, $1 \leq F_{BS} = f_{base}/f_{melt} \leq 500$.

19 Claims, 2 Drawing Sheets

(52) U.S. Cl.
CPC ............... *B22F 2009/0836* (2013.01); *B22F 2009/0848* (2013.01); *B22F 2009/088* (2013.01); *B22F 2009/0888* (2013.01)

(56) References Cited

U.S. PATENT DOCUMENTS

| | | |
|---|---|---|
| 5,226,948 A | 7/1993 | Orme et al. |
| 5,479,538 A | 12/1995 | Blum et al. |
| 2002/0076458 A1* | 6/2002 | Tsao .................. B22F 9/082 425/7 |
| 2016/0318105 A1* | 11/2016 | Gerking ............... B22F 9/082 |
| 2022/0410264 A1 | 12/2022 | Franz et al. |

FOREIGN PATENT DOCUMENTS

| | | | | |
|---|---|---|---|---|
| DE | 4102101 A1 | 7/1992 | | |
| DE | 4320766 A1 | 1/1995 | | |
| DE | 102019122000 A1 | 2/2021 | | |
| EP | 3083107 B1 | 12/2019 | | |
| TW | I593484 B | * 8/2017 | ............... | B22F 9/08 |
| WO | 2021028477 A1 | 2/2021 | | |

* cited by examiner

DEVICE AND METHOD FOR PRODUCING METAL POWDER USING AN INDUCTION COIL AND AN INTERMEDIATE COIL

FIELD OF THE INVENTION

The present invention relates to a device and a method for producing high-purity powder by use of an induction coil and an intermediate coil. More specifically, the present invention relates to a device and a method for melting and atomizing a material to produce powder. In particular, the powder may be high purity metal powder, such as Ni superalloy powder, noble metal powder, or high melting and reactive metal alloy powder. For example, the device and method may serve for producing titanium, zirconium, niobium and/or tantalum alloy powders.

BACKGROUND OF THE INVENTION

Metal powders serve in many fields of application as a starting material for the production of semi-finished products and molded parts. In particular, metal powders can be further processed for this purpose by means of sintering or additive manufacturing techniques. Due to their wide range of applications in, for example, aerospace industry, energy technology, chemical industry, electronics industry and biomedical technology, the demand for (metal) powders and the requirements on the quality of the (metal) powders are continuously increasing.

Conventional devices for the production of powders include means for producing or providing a material melt as well as means for atomizing or nebulizing a melt jet of the material melt.

Known processes for producing the material melt are, for example, the EIGA process (Electrode Induction Melting Inert Gas Atomization), the VIGA process (Vacuum Induction Melting Inert Gas Atomization) and the PIGA process (Plasma Inert Gas Atomization).

Devices for producing metal powder by melting a material bar by use of EIGA technology and subsequently atomizing the molten material are known from the documents DE 4 102 101 A1 and EP 3 083 107 A1. However, there are set limits to the quality of the powders produced by these devices and there is a need for even finer, more uniform powders with an improved powder quality.

SUMMARY OF THE INVENTION

It is therefore an object of the invention to provide a device and a method which overcome the disadvantages of the prior art.

In particular, it is an object of the invention to provide a device and a method that enable the production of even finer, more uniform and/or qualitatively improved powders. The improvement of the powder quality can mean a reduction of satellite formations and/or of gas inclusions in the powder and/or the achievement of an optimal sphericity.

This object is achieved by the subject matter of the independent claims. Further developments and embodiments of the device and the method are subject matter of the dependent claims and the description below.

One aspect of the invention relates to a device or system for producing powder, in particular for producing metal powder. The device may be a device for producing high purity powder of titanium, zirconium, niobium and/or tantalum alloys and/or for producing Ni superalloy powder, precious metal powder or high melting and reactive metal alloy powder.

The device includes a melting chamber and an atomization tower downstream of the melting chamber. Downstream may mean here that the atomization tower is located below the melting chamber during operation. The melting chamber can be applied with a pre-pressure. The atomization tower can be subjected to a counter pressure. The counter pressure can be lower than the pre-pressure. The counter pressure may be equal to the pre-pressure. In one embodiment in which the counter pressure is equal to the pre-pressure, the melting chamber may be connected to the atomization tower via a bypass.

The device comprises a nozzle assembly for atomizing a melt jet, via which the melting chamber is connected to the atomization tower.

An induction coil is arranged inside the melting chamber. The induction coil may comprise a plurality of turns. The induction coil is operated at a melting frequency $f_{melt}$ and is configured to locally melt an at least material rod received therein section-wise in order to generate the melt jet to be atomized. Here, locally melting can be understood to mean that the material rod is heated and melted by the induction coil in the area of one end (one end arranged in the induction coil). The material rod can be continuously advanced so that a continuous, uniform melt jet can be generated. The material rod can be a metal rod. Thus, the melt jet can be a metal melt jet. The material rod may comprise a titanium, zirconium, niobium and/or tantalum alloy, a Ni superalloy powder, a noble metal or another high-melting and reactive metal alloy. The melt jet may be continuous or may be formed of short successive droplets.

The melting frequency $f_{melt}$ is adjustable. A diameter of the melt jet and a melting speed and a melting rate of the melt jet can be influenced by the specific selection of the melting frequency. The melting rate dm/dt can be between 0.1 kg/min and 10 kg/min, preferably between 0.5 kg/min and 8 kg/min, preferably between 1.5 kg/min and 6 kg/min. The material to be melted may comprise magnesium and may have a density of 1600 kg/m³. The material to be melted may comprise aluminum and may have a density of 2700 kg/m³. The material to be melted may comprise tungsten and may have a density of 19000 kg/m³. The diameter of the melt jet may be between 2 mm and 10 mm, preferably between 3 mm and 9 mm, more preferably between 4.5 mm and 7.5 mm. The melting speed can be between 0.01 m/s and 9 m/s, preferably between 0.1 m/s and 5 m/s, more preferably between 0.5 m/s and 4 m/s. The specified value ranges for the diameter of the melt jet and the melting speed as well as the melting rate represent advantageous combinations, i.e. an optimal balance for providing the smallest possible melt jet diameter with nevertheless sufficiently high melting speed.

Further, a separate intermediate coil is arranged inside the melting chamber. Here, separate can mean that the intermediate coil is structurally separate from the induction coil, i.e. does not merely form a section of the induction coil. The intermediate coil may also be controllable separately from the induction coil and may not necessarily be dependent on the control and frequency of the induction coil, although the controls of the two coils may be matched to each other. The intermediate coil may have a plurality of turns.

The intermediate coil and/or the induction coil can each be enclosed by a shielding material, for example a ferrite sheath. In this way, a specific field line guidance can be realized. This allows the frequency range of the separate coils to be adapted, while at the same time a mutual interference between the coils is prevented.

The intermediate coil is located downstream of the induction coil and is aligned coaxially with the induction coil. The intermediate coil is thus arranged between the induction coil and the nozzle assembly, wherein the intermediate coil is spaced apart from the induction coil. The intermediate coil may also be spaced apart from the nozzle assembly, in particular a last turn of the intermediate coil may be spaced apart from an inlet opening of the nozzle assembly. Alternatively, the intermediate coil may extend into the nozzle assembly with a lower end. In this case, the last turn of the intermediate coil may be spaced apart from at least a portion having the smallest inner diameter of the nozzle assembly.

In particular, the induction coil and the intermediate coil are arranged (downstream and coaxially aligned to each other) such that the melt jet generated by the induction coil passes through the intermediate coil. Here, downstream can mean that a last turn of the induction coil facing the intermediate coil is axially spaced from a first turn of the intermediate coil facing the induction coil (along a longitudinal axis of the coils), wherein the first turn of the intermediate coil is arranged closer to the atomization tower than the last turn of the induction coil, i.e. the first turn of the intermediate coil is spaced apart from the last turn of the induction coil in the direction of the atomization tower.

The intermediate coil is operated at a base frequency $f_{base}$ and configured to superheat the melt jet in an area between the induction coil and the nozzle assembly. Superheating can also be described as heating and/or maintaining the melt jet above the liquidus temperature of the material. More precisely, the intermediate coil operated at the base frequency $f_{base}$ may heat the melt jet along the longitudinal axis of the intermediate coil and the melt jet, at least in a portion of an area between the last turn of the induction coil and the inlet opening of the nozzle assembly facing the coils. In this way, cooling of the melt jet before entering the nozzle assembly can be targetedly influenced and thus be prevented or reduced. By preventing or reducing the cooling of the melt jet in this area, it can be avoided that areas of the melt jet (partially) solidify already before entering the nozzle assembly. Solidification before atomization has a significant influence on the quality of the powder produced. This can be specifically counteracted by the intermediate coil, which improves the powder quality.

For example, immediately after melting by means of the induction coil and before entering the intermediate coil, the molten material can have a temperature above its solidus temperature and at most 70° C. above its liquidus temperature ($T_{sol} \leq T \leq (T_{liq}+70°$ C.)). The melt jet may have a temperature above its solidus temperature and at most 100° C. above its liquidus temperature ($T_{sol} \leq T \leq (T_{liq}+100°$ C.)) due to further superheating by means of the intermediate coil after passing through the intermediate coil (i.e., at the lower end of the intermediate coil facing the atomization tower).

The intermediate coil may serve to compensate for radiation losses (which would result in some cooling of the melt jet) or to further increase the superheating of the melt jet.

For a frequency ratio $F_{BS}$ of the base frequency $f_{base}$ to the melting frequency $f_{melt}$ the following can apply:

$$1 \leq F_{BS} = f_{base}/f_{melt} \leq 500;$$

preferably $1 \leq f_{base}/f_{melt} \leq 250$;
further preferably $1 \leq f_{base}/f_{melt} \leq 100$;
more preferably $3 \leq f_{base}/f_{melt} \leq 50$;
still further preferably $8 \leq f_{base}/f_{melt} \leq 25$.

In particular, $F_{BS}$ can be between 5 and 15, preferably between 6.5 and 13.5, more preferably between 8 and 12, further preferably between 9 and 11, even more preferably at about 10.

The specified frequency ratio $F_{BS}$ of the base frequency $f_{base}$ to the melting frequency $f_{melt}$ represents a particularly advantageous relation, since on the one hand cooling can be reliably and sufficiently reduced and on the other hand a very smooth transition between the melting of the material rod (i.e. generation of the melt jet) and superheating of the melt jet can be realized.

The melting frequency $f_{melt}$, the base frequency $f_{base}$ and/or the frequency ratio $F_{BS}$ can be selected according to the material to be melted and/or according to the powder to be produced (and its desired application) and/or according to the coil geometry and structure. In other words, the coils can be controlled as required and operated at corresponding frequencies. Since the design of the arrangement does not have to be modified for this purpose, the arrangement according to the invention can be adapted very flexibly to different applications.

The area between the induction coil and the nozzle assembly can be the smallest distance between the induction coil and the nozzle assembly, i.e. a distance between a last turn of the induction coil facing the nozzle assembly and an upper inlet opening of the nozzle assembly.

In a further development, the intermediate coil can be configured such that a modulation frequency $f_{mod}$ is modulated onto the base frequency $f_{base}$. The modulation frequency $f_{mod}$ modulated onto the base frequency $f_{base}$ can be used to cause or effect a targeted separation or break-up of the continuous melt jet into individual successive droplets that have essentially the same size. In other words, the modulated modulation frequency $f_{mod}$ thus represents a perturbation or interference frequency that causes the targeted separation or break-up of the melt jet into individual droplets of the same size. In the case of a separation of the melt jet into successive droplets, the subsequent atomization can be optimally prepared, whereby a more efficient and an even better atomization can be achieved with respect to the achievable powder quality. The additional base frequency $f_{base}$, which acts on the melt droplets in the area between the induction coil and the nozzle assembly, prevents undesired cooling and, in particular, solidification of the melt jet, which is even more important, especially with a melt jet formed from a large number of melt droplets, in order to ensure a desired powder quality. The targeted breaking up of the melt jet by means of the modulation frequency $f_{mod}$, together with the previous targeted setting of the diameter of the melt jet and the melting speed of the melt jet by means of the melting frequency $f_{melt}$, makes it possible to set the particle size and the quality of the powder in a targeted and application-related manner. This setting can be adapted variably and easily. The setting of droplets of essentially the same size ensures that the solidification is uniform and a very homogeneous powder is produced.

The intermediate coil can include an interference section or zone formed at an end region of the intermediate coil facing the induction coil. Thus, the interference section may also be referred to as an initial interference section or input interference section, since it is provided in a region of the intermediate coil where the melt jet enters the intermediate coil. The remaining part of the intermediate coil, which adjoins the interference section or interference zone, can be described as superheating section or superheating zone. The interference section represents a concentration section and may be designed to squeeze the melt jet locally, briefly and strongly. The intermediate coil may have a reduced inner diameter in the interference section, more specifically a reduced diameter compared to the overheating section or the rest of the intermediate coil. The interference section may extend between 5% and 25% of the length of the intermediate coil, preferably between 10% and 20%, more preferably between 12.5% and 17.5%. The interference section may comprise a particular turn of reduced diameter. Within the interference section cold wall crucible palisades can be disposed within the turn which reduce the diameter through which the melt jet passes. The interference section may include a turn separate from the remaining turns of the intermediate coil and connected in parallel with the remaining turns. The separate turn may be operated at a higher current than the remaining turns.

The intermediate coil may be enclosed section-wise by a non-conductive ferrite material in order to further increase the inductance of the intermediate coil.

Due to the reduced inner diameter or inner cross section of the interference section, a concentration of the influence of the melt jet by the intermediate coil, in particular by the modulated modulation frequency $f_{mod}$, can be realized. This allows the melt jet to be broken up into individual successive droplets in this interference section and thus already at the beginning of the entry into the intermediate coil. These droplets are subsequently superheated when they pass through the superheating section.

The melting frequency $f_{melt}$ can be between 10 KHz and 500 kHz, preferably between 100 kHz and 400 kHz, more preferably between 200 kHz and 300 KHz. The melting frequency $f_{melt}$ may be at least 10 kHz, preferably at least 50 kHz, further preferably at least 100 kHz, more preferably at least 200 kHz, still more preferably at least 250 kHz. The melting frequency $f_{melt}$ may be 500 kHz or less, preferably 450 kHz or less, further preferably 350 kHz or less, more preferably 300 kHz or less, still more preferably 250 kHz or less. Melting frequencies $f_{melt}$ in the specified ranges allow a melt jet diameter of between 2 mm and 10 mm to be set for the materials relevant here.

The base frequency $f_{base}$ may be between 100 kHz and 5000 kHz, preferably between 200 kHz and 4500 kHz, further preferably between 500 kHz and 4000 kHz, more preferably between 1000 kHz and 3000 kHz, still more preferably between 1500 kHz and 2500 kHz. The base frequency $f_{base}$ may be at least 100 kHz, preferably at least 200 kHz, further preferably at least 500 kHz, more preferably at least 1000 kHz, still more preferably at least 1500 kHz. The base frequency $f_{base}$ may be 5000 kHz or less, preferably 4500 kHz or less, further preferably 4000 kHz or less, more preferably 3000 kHz or less, still more preferably 2500 kHz or less. Base frequencies $f_{base}$ in the specified ranges can prevent or reduce undesired cooling of the melt jet for the materials relevant here, in particular with the melt jet diameter preferably set between 2 mm and 10 mm.

The modulation frequency $f_{mod}$ can be between 0.001 kHz and 5 kHz, preferably between 0.005 kHz and 4.5 kHz, further preferably between 0.01 kHz and 4 kHz, more preferably between 0.05 kHz and 3.5 kHz, still more preferably between 0.1 KHz and 3 kHz, still more preferably between 1 kHz and 2.5 kHz. The modulation frequency $f_{mod}$ may be at least 0.001 kHz, preferably at least 0.005 kHz, further preferably at least 0.01 kHz, more preferably at least 0.05 kHz, still more preferably at least 0.1 kHz, still more preferably at least 1 kHz. The modulation frequency $f_{mod}$ may be 5 kHz or less, preferably 4.5 kHz or less, further preferably 4 kHz or less, more preferably 3.5 kHz or less, still more preferably 3 kHz or less, still more preferably 2.5 kHz or less. By modulation frequencies $f_{mod}$ in the specified ranges, a targeted break-up of the melt jet into successive droplets with the desired diameter can be realized for the materials relevant here, in particular with the melt jet diameter preferably set between 2 mm and 10 mm.

The modulation frequency $f_{mod}$ can be selected according to the melt jet diameter and the melting speed, in particular in the interference section. Here, the following can apply:

$$f_{mod} = \frac{v_m}{\lambda},$$

wherein $$\lambda = \sqrt{2}\pi d_0 \sqrt{1 + \frac{3\mu}{\sqrt{\rho\gamma d_0}}},$$

wherein $v_m$=melting velocity in m/s, $\mu$=melt viscosity of the respective material in Pa·s, $\rho$=melt density of the respective material in kg/m$^3$, and $\gamma$=melt surface tension of the respective material in N/m.

The intermediate coil may have a cylindrical shape. The intermediate coil may have a cylindrical shape with at least section-wise and/or predominantly constant diameter. Predominantly constant diameter may mean here that, viewed along the longitudinal axis of the intermediate coil, at least 70% of the intermediate coil, preferably at least 80% of the intermediate coil, more preferably at least 85% of the intermediate coil, have a constant diameter. This allows the melt jet to experience the same energy input at each location in the region of the intermediate coil, and thus to be heated substantially equally at each location throughout its passage (falling) through the intermediate coil.

The length of the intermediate coil as viewed along its longitudinal axis may be greater than four times, preferably greater than five times, more preferably greater than six times the smallest internal diameter of the nozzle assembly. In this way, a particularly effective superheating of the melt jet can be achieved in the region between the induction coil and the nozzle assembly.

The intermediate coil can be configured to superheat the melt jet in at least 50% of a distance defined by the smallest distance between the nozzle assembly and the induction coil (as viewed along the longitudinal axis of the intermediate coil or the device), preferably at least 60%, further preferably at least 70%, more preferably at least 75%, still more preferably at least 80%. By covering such a minimum portion of the distance, undesired cooling of the melt jet can be effectively and sufficiently reduced.

The induction coil can have a shape that is conical at least in sections in the direction towards the nozzle assembly, whereby an effective melting of the material rod can be realized.

The nozzle assembly may comprise or be in the form of a Laval nozzle.

The nozzle assembly may comprise an annular nozzle or be formed in the shape of an annular nozzle.

The Laval nozzle can be configured and arranged in such a way that the melt jet passes through the Laval nozzle from the melting chamber into the atomization tower and an additional gas flows through the Laval nozzle from the melting chamber into the atomization tower, wherein the additional gas accelerates the melt jet as it flows through the Laval nozzle. The annular nozzle can be arranged downstream of the Laval nozzle and/or can be arranged in the region of the Laval nozzle in such a way that an additional atomizing gas flows through the annular nozzle from an atomizing gas source into the atomization tower, as a result of which a locally reduced counterpressure can be generated in a region of an outlet opening of the Laval nozzle adjacent to the atomization tower, so that the following applies to a pressure ratio D between a pre-pressure $P_0$ of the melting chamber and the locally reduced counterpressure $P_2$:

$$D = P_0/P_2 \geq 2.$$

By means of such a double nozzle assembly and the specified pressure ratio, a critical flow through the nozzle can be achieved and the atomization of the melt jet can be improved.

Another aspect of the invention relates to a method for producing metal powder. The method comprises the steps of:
  generating a melt jet to be atomized by locally melting a material rod by means of an induction coil surrounding the material rod at least in sections within the melting chamber, wherein the induction coil is operated at a melting frequency $f_{melt}$;
  superheating the melt jet in a region between the induction coil and a nozzle assembly by means of a separate intermediate coil arranged downstream of the induction coil and aligned coaxially with the induction coil, wherein the intermediate coil is operated at a base frequency $f_{base}$, and wherein the following applies for a frequency ratio $F_{BS}$ of the base frequency $f_{base}$ to the melting frequency $f_{melt}$: $1 \leq F_{BS} = f_{base}/f_{melt} \leq 500$; and
  atomizing the superheated melt jet by means of the nozzle assembly, wherein the melting chamber is connected to an atomization tower via the nozzle assembly.

Another aspect of the invention relates to a device for producing metal powder. The device comprises:
  a melting chamber,
  an atomization tower disposed downstream of the melting chamber,
  a nozzle assembly for atomizing a melt jet, via which the melting chamber is connected to the atomization tower,
  an induction coil arranged within the melting chamber and operated at a melting frequency $f_{melt}$, which is configured to melt a material rod received at least section-wise therein in order to generate the melt jet to be atomized,
  a separate intermediate coil arranged within the melting chamber and operated at a base frequency $f_{base}$, wherein the intermediate coil is arranged downstream of the induction coil and is aligned coaxially with the induction coil, wherein the intermediate coil is configured to superheat the melt jet in a region between the induction coil and the nozzle assembly,
  wherein the intermediate coil is configured such that a modulation frequency $f_{mod}$ is modulated onto the base frequency $f_{base}$.

Although some features, advantages, functions, modes of operation, embodiments, and further developments have been described above with respect to only one aspect of the device, these may apply, mutatis mutandis, to the method and another aspect, and vice versa.

BRIEF DESCRIPTION OF THE FIGURES

Hereinafter, exemplary embodiments of the present invention are explained in more detail with reference to the accompanying schematic figures. In the figures.

DETAILED DESCRIPTION OF THE INVENTION

Figure 1:
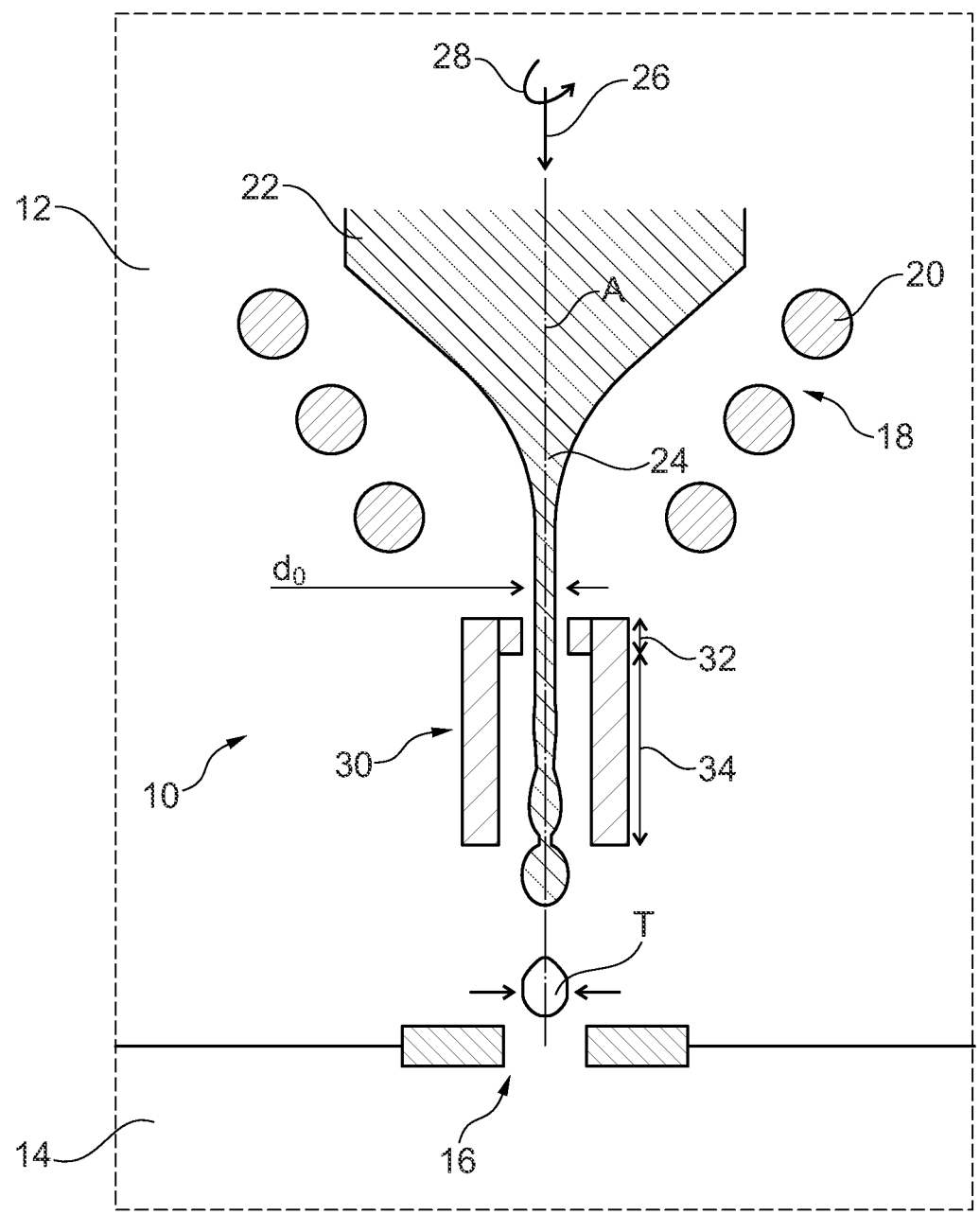
FIG. 1 is a schematic representation of a device according to one embodiment of the invention.

FIG. 1 shows a device or system 10 for producing high purity metal powder. The device 10 comprises a melting chamber 12 and an atomization tower 14 downstream of the melting chamber 12. In the embodiment shown, the melting chamber 12 is arranged above the atomization tower 14 during operation. The melting chamber 12 is connected to the atomization tower 14 via a nozzle assembly 16. That is, an upper end of the nozzle assembly 16 is disposed adjacent to or extends into the melting chamber 12. A lower end of the nozzle assembly 16 is disposed adjacent to or extends into the atomization tower 14.

The nozzle assembly 16 may be integrated as a component into the melting chamber 12. The nozzle assembly 16 may be integrated as a component into the melting chamber 12 and into the atomization tower 14. The nozzle assembly 16 may be integrated as a component into the atomization tower 14. The nozzle assembly 16 may be provided as a separate component between the melting chamber 12 and the atomization tower 14. In the embodiment shown in FIG. 1, the nozzle assembly 16 is provided as a separate component between the melting chamber 12 and the atomization tower 14.

Within the melting chamber 12 an EIGA (Electrode Induction Melting Inert Gas Atomization) assembly 18 comprising an induction coil 20 having a plurality of turns is provided. The induction coil 20 is disposed above and coaxial with the nozzle assembly 16. The induction coil 20 has a shape tapering towards the nozzle assembly 16.

Furthermore, a material rod 22 is arranged within the melting chamber 12, in this case a material rod 22 made of a metal or a metal alloy, preferably Ti64 alloy. An end of the material rod 22 facing the nozzle assembly 16 is at least partially received in the induction coil 20 or extends into the induction coil 20.

The induction coil 20 is operated at a melting frequency $f_{melt}$ and is configured to locally melt the end of the material rod 22 received therein. Here, the induction coil is operated at a melting frequency $f_{melt}$ of 250 kHz. In this way a melt jet 24 to be atomized with a melt jet diameter do of 5 mm in the present example is generated. In the embodiment shown, the melt jet 24 is initially a substantially continuously coherent melt jet 24. As indicated by the arrows 26, 28, the material rod 22 is movably mounted. Thus, the material rod 22 is rotatable about its longitudinal axis A (arrow 28), whereby a uniform melting of the material rod 22 can be achieved. In addition, the material rod 22 is displaceable in the direction of the nozzle assembly 16 (arrow 26) so that the material rod 22 can be continuously fed so that material to be melted (and subsequently atomized or nebulized) can be continuously fed during the atomization or nebulization process. To move the material rod 22, it is connected at its opposite end to a corresponding actuator (not shown). The material rod 22 is arranged coaxially with the induction coil 20 and coaxially with the nozzle assembly 16. The axis A represents the longitudinal or central axis of the EIGA assembly 18, the induction coil 20, the material rod 22 and the nozzle assembly 16.

The device 10 includes an intermediate coil 30 disposed in the melting chamber 12 and operated at a base frequency $f_{base}$. In the embodiment shown, the base frequency is 2000 kHz. Thus, here the frequency ratio $F_{BS}$ of the base frequency $f_{base}$ to the melting frequency $f_{melt}$ is 8.

As can be seen in FIG. 1 (and also FIG. 2), the intermediate coil 30 is formed in addition to the induction coil 20 as a separate intermediate coil 30 structurally separate therefrom. The intermediate coil 30 is disposed downstream of the induction coil 20 and is aligned coaxially with the induction coil 20. Thus, the melt jet 24 passes or falls through the intermediate coil 30 along the longitudinal axis A from the induction coil 20 into the nozzle assembly 16. The base frequency $f_{base}$ of the intermediate coil 30 is selected such that the intermediate coil 30 superheats the melt jet 24 in a region between the induction coil 20 and the nozzle assembly 16, thereby preventing or at least reducing a cooling of the melt jet 24 prior to entry into the nozzle assembly 16. In the embodiment shown, the intermediate coil 30 superheats the melt jet 24 over a distance of about 50% of the shortest distance between the induction coil 20, more specifically a lower end of the induction coil 20, and the nozzle assembly 16, more specifically an upper inlet opening of the nozzle assembly 16.

The intermediate coil 30 of the device 10 shown in FIG. 1 includes an interference section 32, or an interference zone 32, and a superheating section 34 or superheating zone 34 adjacent thereto. The interference section 32 is formed at an upper end region of the intermediate coil 30 facing the induction coil 20, that is, in a region where the melt jet 24 enters the intermediate coil 30. The intermediate coil 30 has an inner diameter in the region of the interference section 32, which is reduced compared to an inner diameter of the superheating section 34. Here, the interference section 32 extends over about 15% of the total length of the intermediate coil 30.

An additional modulation frequency $f_{mod}$ of 0.006 KHz is modulated onto the base frequency $f_{base}$ at which the intermediate coil 30 is operated, i.e. the base frequency $f_{base}$ is superimposed with this modulation frequency $f_{mod}$. The effect of this modulation frequency $f_{mod}$ is that the melt jet 24 is disturbed and thus broken up into individual droplets T in a targeted manner. These droplets T follow one another continuously and thus together form the melt jet 24. Consequently, in the embodiment shown, the melt jet 24 already enters the nozzle assembly 16 in the form of individual droplets T, which are subsequently atomized by the nozzle assembly 16. By selectively setting the melt jet diameter do by means of the melting frequency $f_{melt}$ of the induction coil 20 and the selective setting of the modulation frequency $f_{mod}$ in accordance with $f_{melt}$ or the melt jet diameter do and the melting speed, the device 10 can targetedly influence and set the droplet size. In this manner, the powder properties can be targetedly influenced. The base frequency $f_{base}$ and the modulation frequency $f_{mod}$ are shown schematically in FIG. 3.

After atomization of the melt jet 24 (i.e. the droplets T), the atomized droplets cool in the atomization tower 14 and solidify there to form powder.

Figure 2:
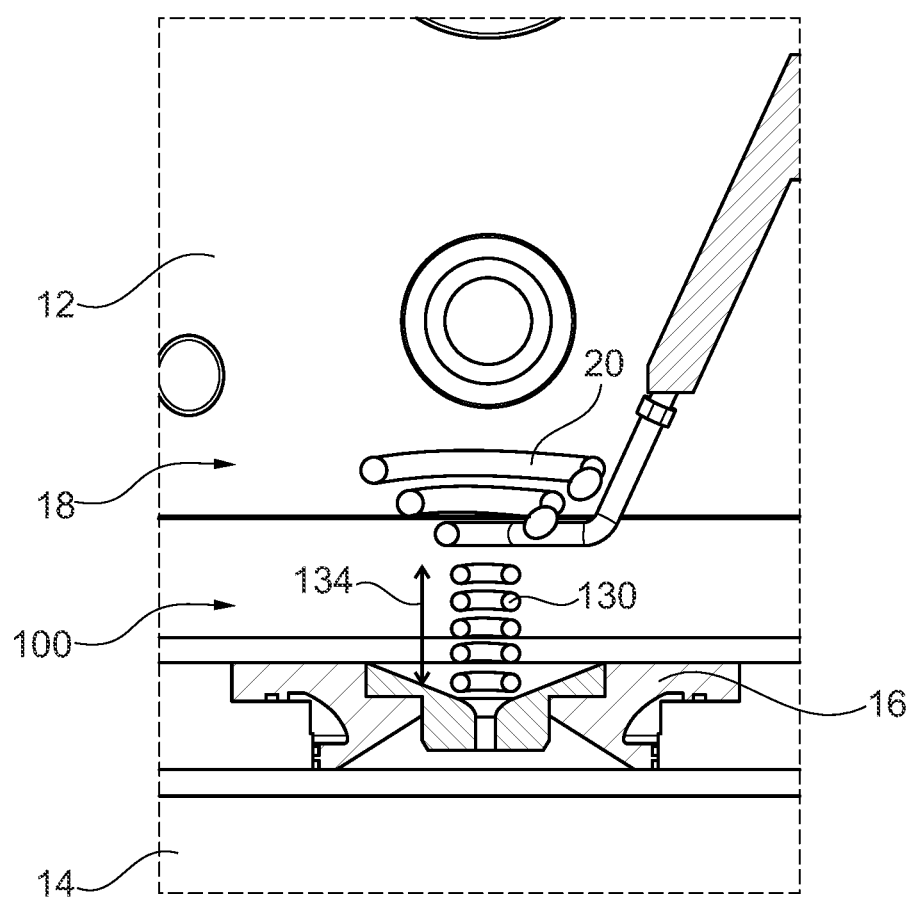
FIG. 2 is a schematic representation of a device according to a further embodiment of the invention.

FIG. 2 shows a device or system 100 for producing high-purity metal powder according to a further embodiment. The device 100 is essentially similar to the device 10 of FIG. 1.

In contrast to the device 10 of FIG. 1, the intermediate coil 130 of the device 100 of FIG. 2 does not comprise different sections or zones, but is formed continuously over its entire length as a superheating zone 134. Nevertheless, in this embodiment, too, a modulation frequency $f_{mod}$ may optionally be modulated onto a base frequency $f_{base}$ at which the intermediate coil 130 is operated for superheating the melt jet (not shown in FIG. 2). The same or other frequencies may be provided as in the embodiment of FIG. 1.

A further difference between the device 100 of FIG. 2 and the device 10 of FIG. 1 is that the intermediate coil 130 of the device 100 extends section-wise into the nozzle assembly 1. In particular, at least one last turn of the intermediate coil 130 facing the atomization tower 14 is arranged here within the nozzle assembly 130.

In the embodiment of FIG. 2, the intermediate coil 130 covers about 80% of a smallest distance between a last turn of the induction coil 130 facing the nozzle assembly 16 and an upper inlet opening of the nozzle assembly 16 and superheats the melt jet in this region. Moreover, in this embodiment, the intermediate coil 130 extends over about 77% of the range of the smallest distance between the last turn of the induction coil 20 facing the nozzle assembly 1 and a portion having the smallest inner diameter of the nozzle assembly 16. Thus, the intermediate coil 130 still superheats the melt jet even in an inlet section of the nozzle assembly 16.

Figure 3:
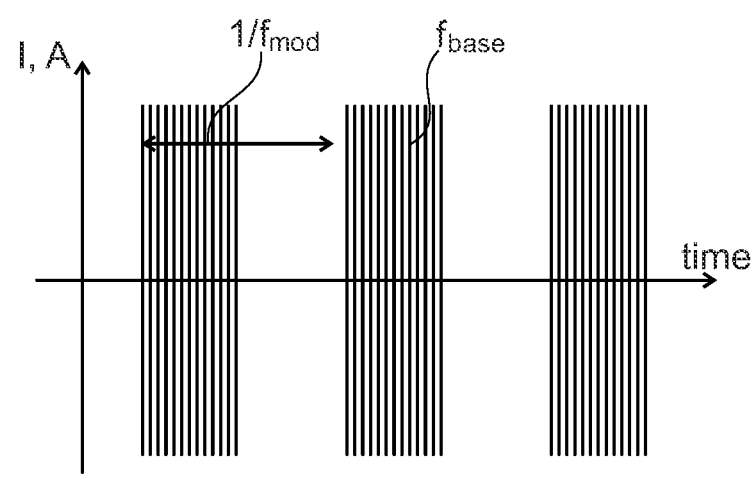
FIG. 3 is a diagram showing the base frequency $f_{base}$ and the modulation frequency $f_{mod}$ at which the intermediate coil is operated.

FIG. 3 shows a schematic diagram of one embodiment illustrating the frequencies at which the intermediate coil 30, 130 is operated. Thus, the diagram illustrates the base frequency $f_{base}$ and the modulated modulation frequency $f_{mod}$ over the time axis.

LIST OF REFERENCE SYMBOLS 10 device
12 melting chamber
14 atomization tower
16 nozzle assembly
18 EIGA assembly
20 induction coil
22 material rod
24 melt jet
26 direction of motion
28 direction of motion
30 intermediate coil
32 interference section
34 superheating section
do melt jet diameter
A longitudinal axis
T droplet

What is claimed is:

1. A device for producing metal powder, wherein the device comprises:
   a melting chamber;
   an atomization tower disposed downstream of the melting chamber;
   a nozzle assembly for atomizing a melt jet, via which the melting chamber is connected to the atomization tower;
   an induction coil arranged within the melting chamber and operable at a melting frequency $f_{melt}$, which is configured to locally melt a material rod received at least section-wise therein in order to produce the melt jet to be atomized, a separate intermediate coil arranged within the melting chamber and operable at a base frequency $f_{base}$ and arranged downstream of the induction coil and aligned coaxially with the induction coil, wherein the intermediate coil is configured to superheat the melt jet in a region between the induction coil and the nozzle assembly, wherein the intermediate coil comprises an interference section formed at an end portion of the intermediate coil facing the induction coil, wherein the intermediate coil has a reduced inner diameter in the interference section, wherein the intermediate coil is configured such that a modulation frequency $f_{mod}$ is modulated onto the base frequency $f_{base}$ at which the intermediate coil is operable, wherein a frequency ratio $F_{BS}$ of the base frequency $f_{base}$ and the melting frequency $f_{melt}$ is settable to:

$$1 \leq F_{BS} = f_{base}/f_{melt} \leq 500.$$

2. The device according to claim 1, wherein the melting frequency $f_{melt}$ is settable to between 10 KHz and 500 kHz, and/or
the base frequency $f_{base}$ is settable to between 100 kHz and 5000 kHz, and/or
the modulation frequency $f_{mod}$ is settable to between 0.001 kHz and 5 KHz.

3. The device according to claim 2, wherein the intermediate coil has a cylindrical shape with predominantly constant diameter.

4. The device according to claim 3, wherein a length of the intermediate coil is greater than four times the smallest inner diameter of the nozzle assembly.

5. The device according to claim 4, wherein the intermediate coil is adapted to superheat the melt jet in at least 70 of a length defined by the smallest distance between the nozzle assembly and the induction coil.

6. The device according to claim 5, wherein the nozzle assembly comprises a Laval nozzle.

7. The device according to claim 5, wherein the nozzle assembly comprises an annular nozzle.

8. The device according to claim 6, wherein the nozzle assembly comprises an annular nozzle.

9. The device according to claim 8, wherein the Laval nozzle is configured and arranged in such a way that the melt jet passes through the Laval nozzle from the melting chamber into the atomization tower and an additive gas flows through the Laval nozzle from the melting chamber into the atomization tower, wherein the additive gas accelerates the melt jet as it passes through the Laval nozzle, and wherein the annular nozzle is arranged downstream of the Laval nozzle and/or in the region of the Laval nozzle in such a way that an additional atomizing gas flows through the annular nozzle from an atomizing gas source into the atomization tower, as a result of which a locally reduced counterpressure can be generated in a region of an outlet opening of the Laval nozzle adjacent to the atomization tower, so that the following applies to a pressure ratio D between a pre-pressure $P_0$ of the melting chamber and the locally reduced counterpressure $P_2$:

$$D = P_0/P_2 \geq 2.$$

10. The device according to claim 2, wherein the melting frequency $f_{melt}$ is settable to between 200 kHz and 300 kHz, and/or
the base frequency $f_{base}$ is settable to between 1500 kHz and 2500 kHz, and/or
the modulation frequency $f_{mod}$ is settable to between 1 kHz and 2.5 kHz.

11. The device according to claim 1, wherein the intermediate coil has a cylindrical shape with predominantly constant diameter.

12. The device according to claim 1, wherein a length of the intermediate coil is greater than four times the smallest inner diameter of the nozzle assembly.

13. The device according to claim 12, wherein the length of the intermediate coil is greater than six times the smallest inner diameter of the nozzle assembly.

14. The device according to claim 1, wherein the intermediate coil is adapted to superheat the melt jet in at least 70 of a length defined by the smallest distance between the nozzle assembly and the induction coil.

15. The device according to claim 1, wherein the nozzle assembly comprises a Laval nozzle.

16. The device according to claim 15, wherein the nozzle assembly comprises an annular nozzle, wherein the Laval nozzle is configured and arranged in such a way that the melt jet passes through the Laval nozzle from the melting chamber into the atomization tower and an additive gas flows through the Laval nozzle from the melting chamber into the atomization tower, wherein the additive gas accelerates the melt jet as it passes through the Laval nozzle, and wherein the annular nozzle is arranged downstream of the Laval nozzle and/or in the region of the Laval nozzle in such a way that an additional atomizing gas flows through the annular nozzle from an atomizing gas source into the atomization tower, as a result of which a locally reduced counterpressure can be generated in a region of an outlet opening of the Laval nozzle adjacent to the atomization tower, so that the following applies to a pressure ratio D between a pre-pressure $P_0$ of the melting chamber and the locally reduced counterpressure $P_2$:

$$D = P_0/P_2 \geq 2.$$

17. The device according to claim 1, wherein the nozzle assembly comprises an annular nozzle.

18. A method for producing metal powder using the device according to claim 1, comprising the steps of:
generating the melt jet to be atomized by locally melting the material rod by the induction coil which surrounds the material rod at least section-wise within the melting chamber, wherein the induction coil is operated at a melting frequency $f_{melt}$;
superheating the melt jet in a region between the induction coil and the nozzle assembly by the separate intermediate coil arranged downstream of the induction coil and aligned coaxially with the induction coil, wherein the intermediate coil is operated at the base frequency $f_{base}$, and wherein the modulation frequency $f_{mod}$ is modulated onto the base frequency $f_{base}$, and wherein the following applies to a frequency ratio $F_{BS}$ of the base frequency $f_{base}$ to the melting frequency $f_{melt}$: $1 \leq F_{BS} = f_{base}/f_{melt} \leq 500$; and atomizing the superheated melt jet by the nozzle assembly, wherein the melting chamber is connected to the atomization tower via the nozzle assembly.

19. A device for producing metal powder, wherein the device comprises:

a melting chamber;

an atomization tower disposed downstream of the melting chamber;

a nozzle assembly for atomizing a melt jet, via which the melting chamber is connected to the atomization tower;

an induction coil arranged within the melting chamber and operable at a melting frequency $f_{melt}$, which is configured to locally melt a material rod received at least section-wise therein in order to produce the melt jet to be atomized, a separate intermediate coil arranged within the melting chamber and operable at a base frequency $f_{base}$ and arranged downstream of the induction coil and aligned coaxially with the induction coil, wherein the intermediate coil is configured to superheat the melt jet in a region between the induction coil and the nozzle assembly, wherein the intermediate coil is configured such that a modulation frequency $f_{mod}$ is modulated onto the base frequency $f_{base}$ at which the intermediate coil is operable, wherein a frequency ratio $F_{BS}$ of the base frequency $f_{base}$ and the melting frequency $f_{melt}$ is settable to:

$$1 \leq F_{BS} = f_{base}/f_{melt} \leq 500,$$

wherein the nozzle assembly comprises a Laval nozzle, wherein the nozzle assembly comprises an annular nozzle, wherein the Laval nozzle is configured and arranged in such a way that the melt jet passes through the Laval nozzle from the melting chamber into the atomization tower and an additive gas flows through the Laval nozzle from the melting chamber into the atomization tower, wherein the additive gas accelerates the melt jet as it passes through the Laval nozzle, and wherein the annular nozzle is arranged downstream of the Laval nozzle and/or in the region of the Laval nozzle in such a way that an additional atomizing gas flows through the annular nozzle from an atomizing gas source into the atomization tower, as a result of which a locally reduced counterpressure can be generated in a region of an outlet opening of the Laval nozzle adjacent to the atomization tower, so that the following applies to a pressure ratio D between a pre-pressure $P_0$ of the melting chamber and the locally reduced counterpressure $P_2$:

$$D = P_0/P_2 \geq 2.$$

* * * * *